(12) United States Patent
Jain

(10) Patent No.: US 11,915,341 B2
(45) Date of Patent: Feb. 27, 2024

(54) REPEAT OBJECT BLENDING

(71) Applicant: Adobe Inc., San Jose, CA (US)

(72) Inventor: Gaurav Jain, Noida (IN)

(73) Assignee: Adobe Inc., San Jose, CA (US)

( * ) Notice: Subject to any disclaimer, the term of this patent is extended or adjusted under 35 U.S.C. 154(b) by 55 days.

(21) Appl. No.: 17/670,741

(22) Filed: Feb. 14, 2022

(65) Prior Publication Data

US 2023/0260165 A1    Aug. 17, 2023

(51) Int. Cl.
| | |
|---|---|
| *G06T 11/00* | (2006.01) |
| *G06V 20/60* | (2022.01) |
| *G06T 7/70* | (2017.01) |
| *G06T 7/90* | (2017.01) |

(52) U.S. Cl.
CPC .............. *G06T 11/00* (2013.01); *G06T 7/70* (2017.01); *G06T 7/90* (2017.01); *G06V 20/60* (2022.01); *G06T 2207/20036* (2013.01); *G06T 2207/20212* (2013.01); *G06T 2207/30242* (2013.01)

(58) Field of Classification Search
CPC ... G06T 11/00; G06T 7/90; G06T 7/70; G06T 2207/20036; G06T 2207/20212; G06T 2207/30242; G06V 20/60
USPC .......................................................... 345/647
See application file for complete search history.

(56) References Cited

U.S. PATENT DOCUMENTS

| | | | | |
|---|---|---|---|---|
| 2007/0013711 A1* | 1/2007 | Asente | .................. | G06T 11/001 |
| | | | | 345/581 |
| 2009/0097744 A1* | 4/2009 | Schultz | .................... | G06T 7/90 |
| | | | | 382/167 |
| 2009/0309877 A1* | 12/2009 | Snyder | .................... | G06T 15/60 |
| | | | | 345/426 |
| 2014/0133748 A1* | 5/2014 | Wright | .................... | G06T 11/00 |
| | | | | 382/167 |
| 2021/0312590 A1 | 10/2021 | Beri et al. | | |

OTHER PUBLICATIONS

U.S. Appl. No. 16/838,864, "Notice of Allowance", U.S. Appl. No. 16/838,864, dated Jun. 3, 2022, 7 pages.
"Non-Final Office Action", U.S. Appl. No. 16/838,864, dated Mar. 29, 2022, 7 pages.

* cited by examiner

*Primary Examiner* — Hai Tao Sun
(74) *Attorney, Agent, or Firm* — FIG. 1 Patents

(57) ABSTRACT

In implementations of repeat object blending, a computing device implements a repeat object blending system, which is implemented to receive a digital image depicting a first object and a second object, where the first object is depicted as multiple instances of a repeated base object, and the second object is depicted as multiple instances of a visually different repeated base object. The repeat object blending system can identify visual characteristics of the first object and the second object. The repeat object blending system can then generate an intermediate object by blending one or more of the visual characteristics of the first object and one or more of the visual characteristics of the second object. The resulting intermediate object is a visual representation of the repeated base object blended with the visually different repeated base object.

20 Claims, 7 Drawing Sheets

REPEAT OBJECT BLENDING

BACKGROUND

Generally, graphic designers or other similar computer users utilize computer-based image editing and graphics design software applications to develop digital content, such as images, video, and any other types of design documents. Graphics designers and artists often utilize these software applications to generate repeat objects, which are objects that include multiple instances of a base object. A graphic designer may also want to blend visually different, repeat objects together to create and/or transform different shapes, digital objects, and abstract art. However, conventional graphics design applications do not support blending between repeat objects, due in part to the complications of unbalanced numbers of object instances in repeat objects, and the many variable features that are subject to transformations to create a blended object. Accordingly, the graphic designer is tasked with blending the color, shape, and the many various features of the repeat objects, requiring a great deal of creative input time and user expertise to create a blended object.

SUMMARY

This Summary introduces features and concepts of repeat object blending, which is further described below in the Detailed Description and shown in the Figures. This Summary should not be considered to describe essential features of the claimed subject matter, nor used to determine or limit the scope of the claimed subject matter.

Aspects of repeat object blending are described. In implementations, a computing device, such as a mobile phone or desktop computer, includes a memory component that maintains any type of digital image, such as a digital photograph, a digital video frame of a video clip, and the like. These digital images may depict various objects, including repeat objects that are depicted as multiple instances of a repeated base object. A digital image may also depict single image objects that are depicted as one instance of a base object. The computing device implements a repeat object blending system for generation of an intermediate object from single and/or repeat objects in the digital image.

In implementations, the repeat object blending system obtains a digital image as an input image. The repeat object blending system detects a first object depicted as a repeat object having multiple instances of a repeated base object and detects a second object depicted as either a single or repeat object having one or multiple instances of a visually different base object. The repeat object blending system identifies visual characteristics of the first and second objects, respectively, such as visual characteristics of the respective base object (e.g., colors, patterns, shapes), visual characteristics of each instance of the respective base object (e.g., position, size, orientation), visual relationships between the instances of the respective base object (e.g., a path between the instances), a determined total number of instances of the respective base object, and so forth. In some implementations, the identified visual characteristics of the objects are leveraged to convert the first and second objects into respective spline representations. A spline representation is a spline path between multiple instances of transformations of a respective base object. A spline path for a single object is represented by a single node. In some instances, the transformations (e.g., representing rotations, translations, shear, and scaling) of each instance are represented by an affine transformation matrix.

The repeat object blending system generates an intermediate object by blending the identified visual characteristics of the first and second objects. In implementations, blending the visual characteristics includes interpolating between the spline representations of the first and second objects (e.g., the spline paths and the transformations), blending the repeated base object with the visually different repeated base object, interpolating between the total number of instances of the repeated base object and the total number of instances of the visually different base object, and the like. The intermediate object includes multiple instances of an intermediate repeated base object that is the visual representation of the repeated base object blended with the visually different base object.

A type of computer graphic for the repeated base object and the visually different base object may be determined. In some implementations, the repeated base object and the visually different base object are raster objects, and the base objects are blended by interpolating between pixel colors of the respective raster objects. In some alternate implementations, the repeated base object and the visually different base object are vector objects, and the base objects are blended by interpolating between multiple nodes and curves of the repeated base object and multiple nodes and curves of the visually different base object.

BRIEF DESCRIPTION OF THE DRAWINGS

Implementations of repeat object blending are described with reference to the following Figures. The same numbers may be used throughout to reference similar features and components that are shown in the Figures.

DETAILED DESCRIPTION

Figure 1:
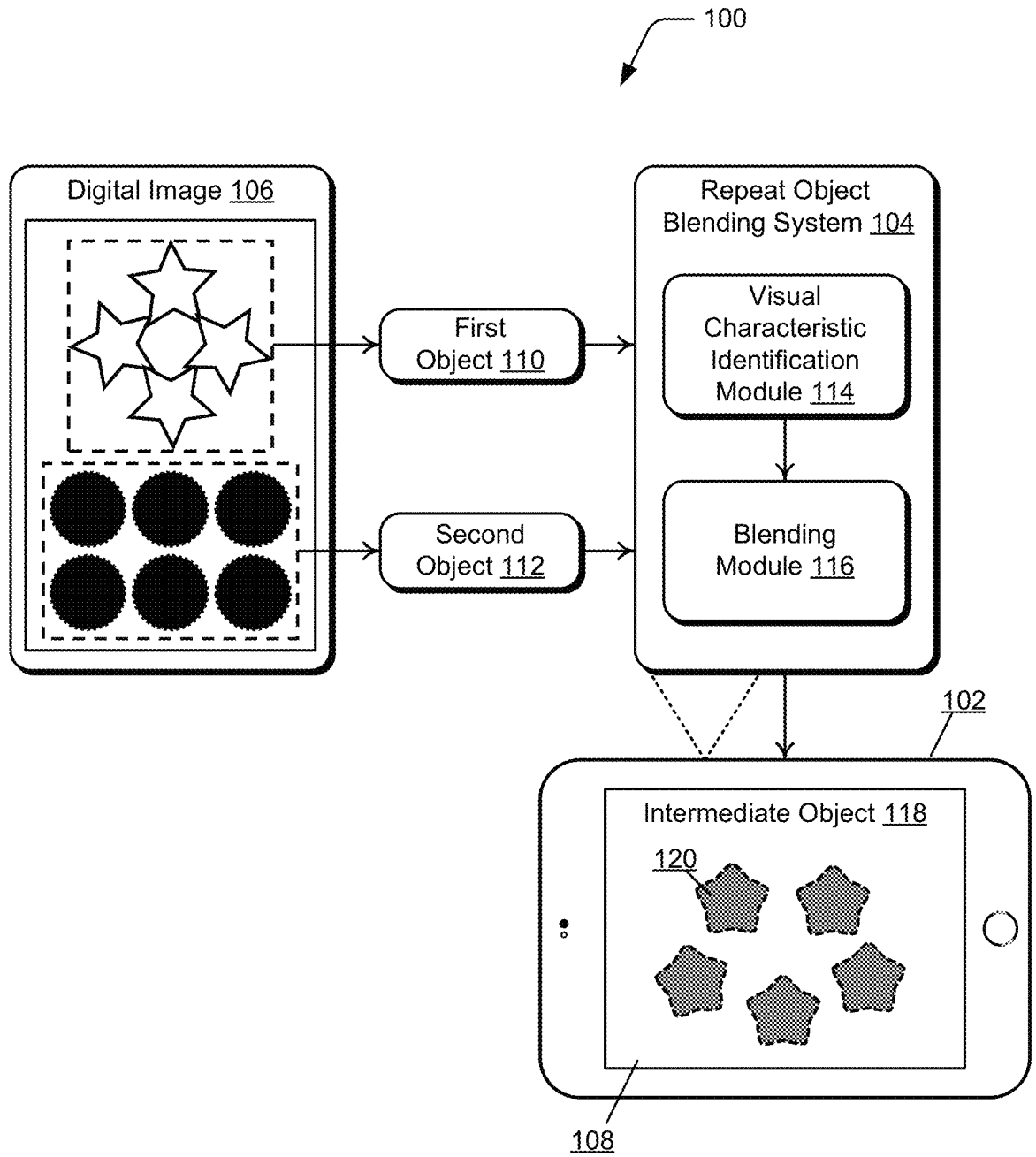
FIG. 1 illustrates an example of a repeat object blending system implemented by a computing device in accordance with implementations as described herein.

Implementations of repeat object blending are described and provide a repeat object blending system for intermediate object generation. Many different types of computer applications are utilized for graphic design, publication development, digital photo enhancement, digital video enhancement, video processing, multi-media production, and the like. Often, graphic designers, artists, and video editing professionals want to enhance the content of a particular digital image or a digital video frame by generating an intermediate object that appears as a transition between two or more blended objects. For example, a user of a computing device can select an input image that has single objects and/or repeat objects, e.g., objects that have multiple instances of a repeated base object. Generally, a repeat object blending system implements a combination of visual characteristic identification and blending techniques to generate intermediate objects that are visual representations of blended single and/or repeat objects. Notably, the features of repeat object blending described herein enable designers who work with digital content that includes repeat objects to generate blended intermediate objects.

Generally, there is no current system or technique to automatically generate intermediate repeat objects from repeat objects. Many graphic designers work with digital images with repeat objects in image editing applications, such as computer-based image editing and graphics design software applications. A repeat object has multiple instances of a repeated base object, and each instance may have a different corresponding transformation from the repeated base object. Conventional image editing applications typically blend single-instanced objects to generate single-instanced intermediate objects. However, applying single-instanced blending techniques on separate instances of each repeat object can create undesirable results and lead to a poor user experience, especially when blending vast numbers of instances of repeat objects. Even with a low number of instances to be blended, this approach is not performant or efficient, and can fail to provide spatially and visually accurate intermediate objects, such as when the structure and shape of the repeat objects to be blended differ.

The techniques for repeat object blending include a repeat object blending system that receives an input of a digital image depicting one or more objects. The digital image may be formatted as a computer graphic, e.g., a raster-based computer graphic, a vector-based computer graphic, etc. An object detection module of the repeat object blending system detects objects in the digital image and determines which objects of the image are visually similar to one another. A set of objects determined to be visually similar are determined as a repeat object, where each object of the set of objects is determined as an instance of a repeated base object. The user of the computing device can further select a detected repeat object as a first object and one or more detected single and/or repeat objects as second objects for repeat object blending.

An object conversion module of the repeat object blending system converts the detected repeat objects into transformations and/or path representations. Examples of a transformation of an instance from the repeated base object include a scaling factor, translation within the digital image, rotation, shear, reflection, and so forth. A path representation is a path that connects each instance of a repeat object together, and each instance has a respective rotation of the path. Various path representations can be defined by a spline representation, such as a grid pattern, a radial pattern, or a concentric pattern of instances of a repeat object.

A visual characteristic identification module of the repeat object blending system identifies visual characteristics of the objects detected in the digital image. Examples of visual characteristics of objects include visual characteristics of a respective base object (e.g., colors, patterns, shapes), visual characteristics of each instance of the respective base object (e.g., position, size, orientation), visual relationships between the instances of the respective base object (e.g., a path representation between the instances, a transformation between the instances to the respective repeated base object), a determined total number of instances of the respective base object, and so forth.

A blending module of the repeat object blending system then generates intermediate objects by blending at least some of the identified visual characteristics of the first and second objects. The blending module may determine visual characteristics of the intermediate objects automatically and/or receive user control inputs specifying parameters related to repeat object blending, such as a number of intermediate objects, a blending value, a path between the repeat objects, and the like.

The techniques of the repeat object blending system allow designers to build and blend objects with vast numbers of repeated instances and/or complex nesting of objects, improving the accuracy, performance, and efficiency of repeat object blending results and improving the user experience. The resulting intermediate objects are both spatially and visually accurate with respect to the first and second objects.

While features and concepts of repeat object blending can be implemented in any number of different devices, systems, networks, environments, and/or configurations, implementations of repeat object blending are described in the context of the following example devices, systems, and methods.

FIG. 1 illustrates an example 100 of a computing device 102 that implements a repeat object blending system 104 in accordance with implementations as described herein. The computing device 102 can be implemented as any type of consumer electronic device, computing device, client device, mobile device, mobile phone, tablet device, communication, entertainment, gaming, media playback, and/or other type of electronic and/or computing device. In this example 100, the computing device 102 may include any number and combination of different components as further described with reference to the example device shown in FIG. 9. Generally, the computing device 102 includes a memory component and a processor, as well as a display device to display the digital image 106. As detailed in the device description of the example device shown in FIG. 3, the computing device 102 can display a user interface 108 of a computer application implemented by the computing device. For example, many different types of computer applications implement features or functions that provide for graphic design, publication development, artistic creations, digital photo enhancement, digital video frame enhancement, and the like.

In this example 100, a graphics designer may be a user of the computing device 102 who selects an input digital image 106 that depicts various objects from which the user wants to create a new object by repeat object blending. Generally, repeat object blending is described herein as blending visual characteristics of two or more objects, where at least one of those objects is a repeat object having multiple instances of a repeated base object. By blending the visual characteristics of these objects, the repeat object blending system generates an intermediate object that is a visual representation of the two or more objects. The digital image 106 can be selected from any digital image that is accessible via the computing device, such as a digital video frame from a video clip, a digital photo that has been captured with a camera device and stored in a photo collection on the computing device 102, or a digital image that is accessible from cloud storage via a network connection with the computing device. The digital images may include computer graphics such as raster objects and/or vector objects. In some implementations, multiple input images can be selected for repeat object blending.

The computing device 102 implements the repeat object blending system 104 (e.g., as a module, a component, a software application, etc.). In some instances, the repeat object blending system 104 can receive a selection of objects depicted in the input digital image 106, one or more of the objects being a repeat object. In some instances, the repeat object blending system 104 can detect objects in the input image for repeat object blending, as further described in the description of FIG. 3. In this example 100, the objects depicted within the digital image include a first object 110 and a second object 112.

The repeat object blending system 104 includes a visual characteristic identification module 114 that can identify visual characteristics of depicted objects in the digital image 106. In implementations, the visual characteristic identification module 114 can utilize any known technique, or a combination of known, different techniques for identifying visual characteristics of objects in an image. These visual characteristics may include visual characteristics of a respective base object, as well as the relative visual characteristics of each instance, such as transformations and layer arrangement order. For example, the first object 110 is depicted as a repeat object having multiple instances (e.g., four instances) of a repeated base object (e.g., a white star with a solid border) and the second object 112 is depicted as another repeat object having multiple instances (e.g., six instances) of a visually different base object (e.g., a black circle with a dotted border). In this example, the visual characteristics identified for the first object 110 include that the repeated base object is a white color, a star shape, has a black solid border, as well as the translation and rotation of each instance. Additionally, the topmost instance of the first object 110 is arranged on a lower layer than the other objects of the first object 110, e.g., the topmost instance is overlapped by the leftmost and rightmost instances.

The repeat object blending system 104 also includes a blending module 116 to implement aspects of repeat object blending. The blending module can generate an intermediate object 118 based on the identified visual characteristics of the objects depicted in the digital image. In this example, visual characteristics of the repeated base object of the first object 110 (e.g., the white star with a solid border) are blended with the visual characteristics of the visually different repeated base object of the second object 112 (e.g., the black circle with a dotted border), as shown by an intermediate repeated base object 120 (e.g., a gray rounded star with a dashed border). Additionally, the transformations of the instances of the objects and the number of instances depicted in the first object 110 and the second object 112 is blended. In this example, the intermediate object 118 is determined to have 5 instances based on blending 4 instances of the first object 110 with 6 instances of the second object 112.

Figure 2:
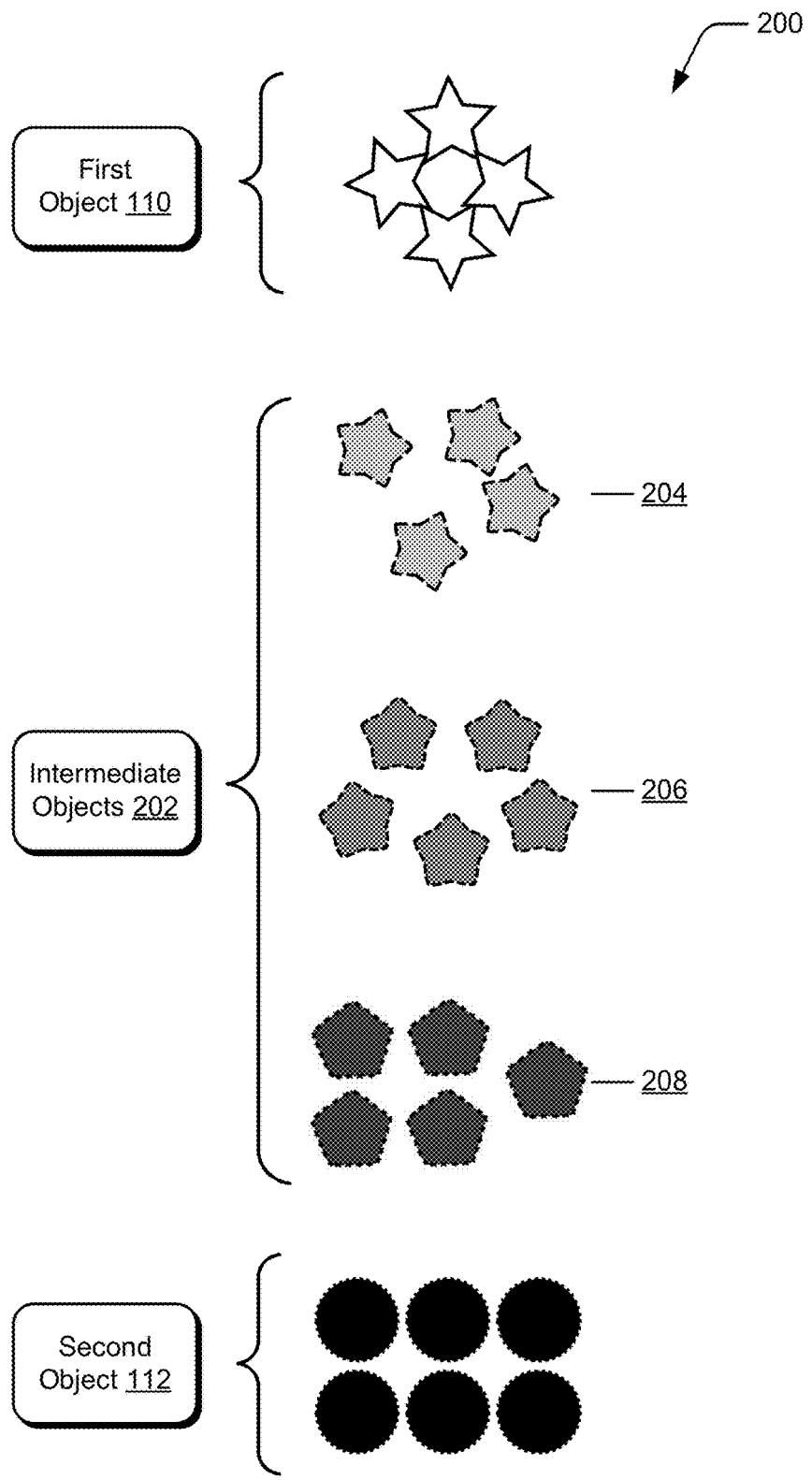
FIG. 2 illustrates an example of techniques for repeat object blending as implemented by the example computing device.

FIG. 2 illustrates an example 200 of techniques for repeat object blending as implemented by the example computing device. As noted above, the visual characteristic identification module 114 of the repeat object blending system 104 can identify respective visual characteristics of the first object 110 and the second object 112 in the digital image. In the example 200, the blending module 116 of the repeat object blending system generates intermediate objects 202. The blending module 116 may determine automatically and/or receive user control specifying parameters related to repeat object blending, such as a number of intermediate objects, a blending value, a path between the repeat objects, and the like. In this example 200, a number of intermediate objects are illustrated, as represented by the intermediate objects 204, 206, and 208. Although only three intermediate objects are depicted in this example, any number of intermediate objects may be determined by the blending module 116 in implementations of the techniques described herein. In one example, each of the intermediate objects 202 are configured as respective frames of a video, such that a transition from the first object 110 to the second object 112 can be displayed.

For each of the intermediate objects 202, for example, a blending value is identified. A blending value of a particular intermediate object is an extent of blending between blended objects for a particular intermediate object. In this example 200, the intermediate objects may have equally incremented blending values of 0.25, 0.50 and 0.75, corresponding to the intermediate objects 204, 206, and 208, respectively, where 0 represents the first object and 1 represents the second object. In other examples, the blending values for intermediate objects are unequally incremented, such as based on user input and/or based on the intermediate object's position on a path between the repeat and intermediate objects. In examples, the blending value is leveraged by the blending module 116 to determine visual characteristics of the intermediate objects. One or more visual characteristics of the first object 110 and the second object 112 are defined to a normalized range, e.g., a range of color from white of the first object 110 to black of the second object 112. Then, the blending value is applied to the range, e.g., the blending value 0.25 of the intermediate object 204 is applied to the range from white to black, resulting in a light grey color that is 25% between the white of the first object 110 and the black of the second object. The blending value can be used for blending various other visual characteristics of the first object 110 and the second object 112, respectively, such as borders, shape, and the like as described herein.

As depicted in this example 200, a path between the repeat objects is a linear path, e.g., a straight line can be drawn through the center of all five repeat objects shown in the example. Alternatively or in addition, the path between the repeat objects may be a linear path, a spline path, Bezier curve path, a combination of multiple paths, and the like. Additionally, a path between the intermediate objects may be determined based on user input.

Figure 3:
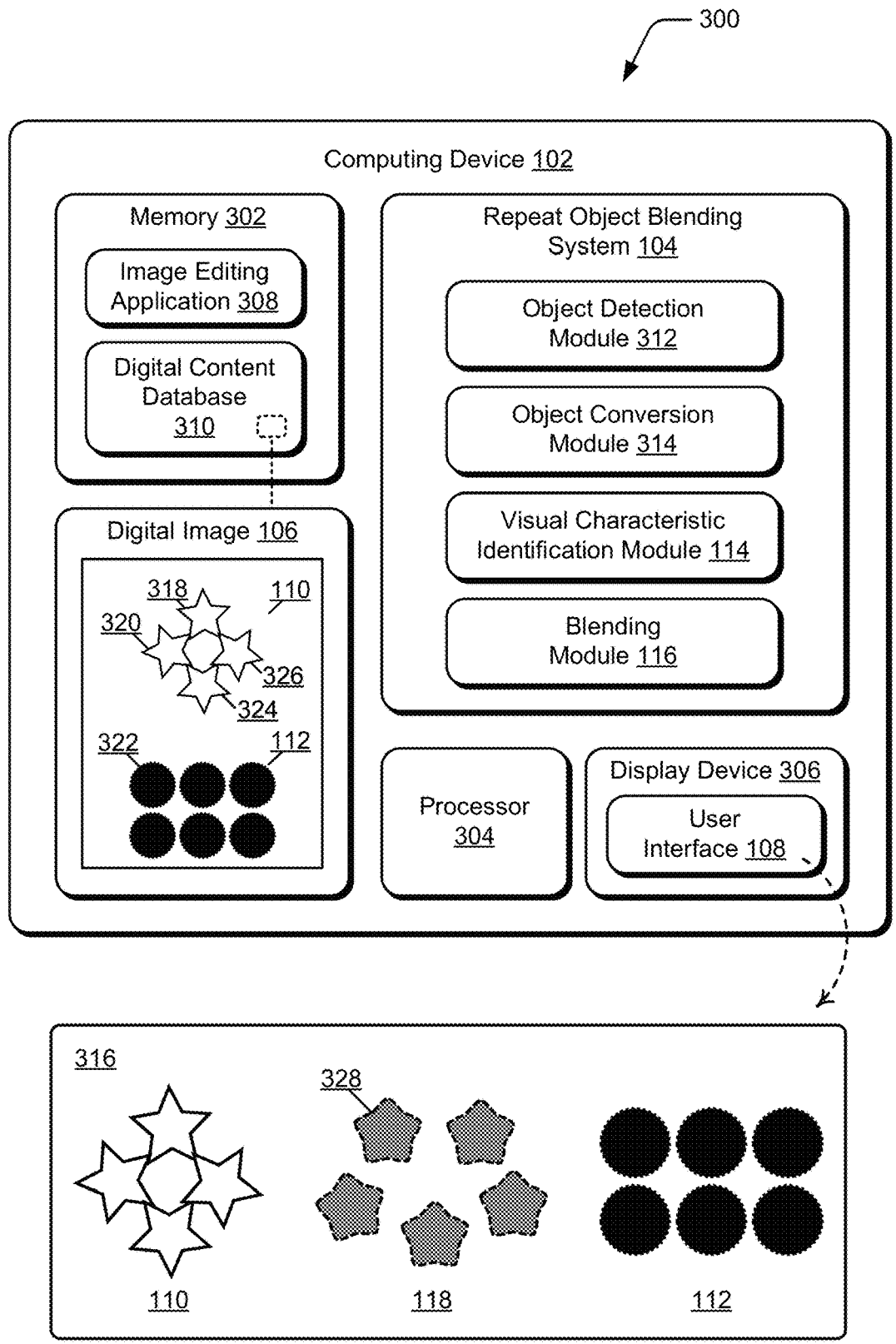
FIG. 3 illustrates an example of features of the computing device that implements aspects of the techniques for repeat object blending.

FIG. 3 illustrates an example 300 of features of the computing device 102 that implements aspects of the techniques for repeat object blending, as described herein. As shown and described with reference to FIG. 1, the computing device 102 can be implemented as any type of computing device that includes any number and combination of different components as further described with reference to the example device shown in FIG. 9. Generally, the computing device 102 includes a memory 302 and a processor 304, as well as a display device 306 to display digital images in the user interface 108 of an image editing application 308. The user interface 108 may include various user-selectable image editing functions of an image editing application 308, such as repeat object blending functions that support techniques of the repeat object blending system 104. In this example 300, the memory 302 maintains the image editing application 308 as well as a digital content database 310. The digital content database 310 may include various forms of digital content, including, but not limited to, digital images, digital videos, augmented reality content, and virtual reality content. Further, as shown and described with reference to FIG. 1, the repeat object blending system 104 includes the features, components, modules, software, firmware, and/or hardware that implement an object detection module 312, an object conversion module 314, the visual characteristic identification module 114, and the blending module 116 to determine visual characteristics of objects and generate a digital image 316 with an intermediate object 118, as generated from the first object 110 and the second object 112 as repeat objects.

In this example 300, the repeat object blending system 104 obtains the digital image 106 for repeat object blending, such as via image selection input from a user in the user interface 108. This digital image may be selected as a frame of digital content (e.g., a video frame) from the digital content database 310. The object detection module 312 of the repeat object blending system 104 can be implemented by the computing device 102 to detect single and/or repeat objects from the obtained digital images. Aspects of detecting a respective object in a digital image may include determining external edges of the object, determining visual characteristics of the object, identifying a type of the object (e.g., type of computer graphic), and the like.

In an example, the object detection module 312 detects an initial object 318 depicted in the digital image 106, e.g., depicted as a topmost star in the digital image 106. The object detection module 312 identifies subsequent objects in the digital image 106, e.g., a subsequent object 320 depicted as a leftmost star in the digital image 106 and a second subsequent object 322 depicted as the top-left circle in the digital image 106. The object detection module 312 determines whether each subsequent object (320, 322) is within a degree of visual similarity to the initial object 318. For example, the object detection module 312 compares the initial object 318 to the subsequent object 320 and determines that the subsequent object 320 is visually similar to the initial object 318 (e.g., the subsequent object 320 is also a star). A first object 110 is generated as a repeat object to include the initial object 318 and the subsequent object 320 by the object detection module 312. For example, the second subsequent object 322 is compared to the initial object 318. Based on a determination that the second subsequent object 322 is visually different to the initial object 318 (e.g., the second subsequent object 322 is a circle), the object detection module 312 does not include the second subsequent object 322 in the first object 110. The object detection module 312 compares subsequent detected objects in the digital image 106 to the initial object 318 and the second subsequent object 322. In this example 300, the object detection module 312 sorts all the objects depicted in the image such that all objects are determined to be instances of a repeat object or a single instance object.

An object conversion module 314 can be implemented by the repeat object blending system 104 to convert the instances of the repeat object (e.g., the initial object 318, and the subsequent object 320) into transformation representations of the first object 110 as a repeat object. A first instance of the first object 110 is selected to be a repeated base object 324. For each other object (e.g., 318, 320, 326) as an instance of the first object 110, the object conversion module 314 determines a transformation from the repeated base object 324. Examples of a transformation of an instance from the repeated base object include a scaling factor, translation within the digital image, rotation, shear, reflection, and so forth. The transformation may be determined as an affine transformation matrix, a matrix of parameters that specify the transformations to apply to the repeated base object 324 to produce a particular object (e.g., 318, 320, 326) as an instance of the first object 110. In one example, an affine transformation matrix has six parameters, "a," "b," "c," "d," "e," and "f" In this example, the magnitude of the "a" and "d" parameters represent scaling along the x- and y-directions, respectively; the relative values of the "a," "b," "c," and "d" parameters represent rotation; and the "e" and "f" parameters represent translation along the x- and y-directions, respectively. In this example, the affine transformation matrix is represented in the following notation:

$$M = \begin{bmatrix} a & b & e \\ c & d & f \\ 0 & 0 & 1 \end{bmatrix}$$

In this example, the first instance as the repeated base object 324 has an affine matrix transformation as an identity matrix. In some instances, an instance of a repeated base object with linear and/or rotational symmetry may have multiple different affine transformation matrixes that adequately represent the transformation of the instance. In some instances, a first and/or simplest affine transformation matrix determined may be selected to represent the transformation of the instance. It is to be appreciated that a repeat object in a plurality of digital images may be represented similarly by a three-dimensional affine transformation matrix. In other examples, a repeat object is received as a repeated base object and a set of corresponding affine transformation matrixes.

The visual characteristic identification module 114 can be implemented to determine respective types of computer graphic of the repeated base object and the visually different base object, e.g., raster, vector, and so forth. In some implementations, the repeated base object 324 and the visually different base object (depicted as the second subsequent object 322) are raster objects and are blended by interpolating between pixel colors of the repeated base object 324 and the visually different base object (depicted as the second subsequent object 322) to generate an intermediate base object 328. In some alternate implementations, the repeated base object 324 and the visually different base object (depicted as the second subsequent object 322) are vector objects and are blended by interpolating between multiple nodes and curves of the repeated base object 324 and multiple nodes and curves of the visually different base object (depicted as the second subsequent object 322) to generate an intermediate object 118.

Figure 4:
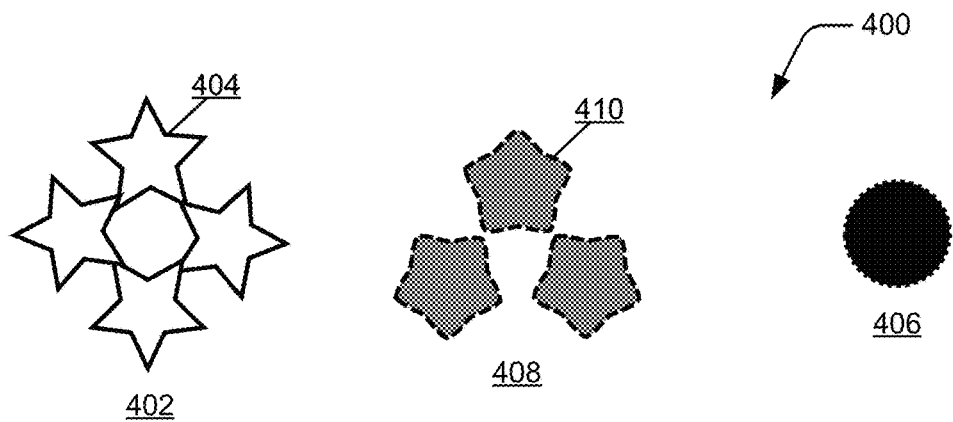
FIGS. 4-6 further illustrate examples of techniques for repeat object blending as implemented by the example computing device.
Figure 5:
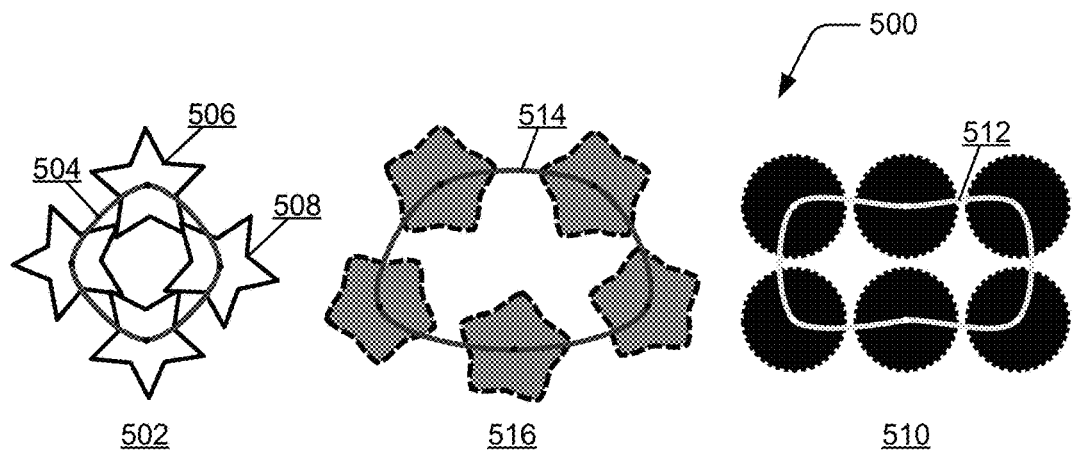
Figure 6:
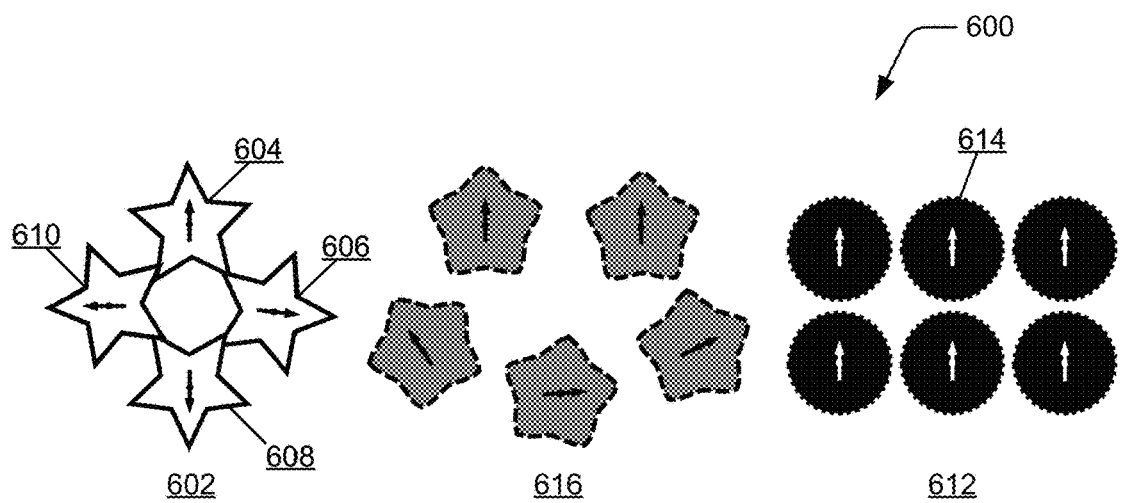

FIGS. 4-6 further illustrate examples of techniques for repeat object blending as implemented by the example computing device, as described herein. In an example 400, a first object 402 as a repeat object with four instances of a repeated base object 404 and a second object 406 as a visually different single object are blended based on respective visual characteristics to generate an intermediate object 408 that has three instances of an intermediate base object 410.

In an example 500, the object conversion module 314 converts a first repeat object 502 into a path representation, such as a first spline representation 504, depicted by the path between the center of each instance (506, 508) of the first repeat object 502. A spline representation of a repeat object includes a spline path that connects the instances of the repeat object (506, 508). Various path representations can be defined by a spline representation, such as a grid pattern, a radial pattern, or a concentric pattern of instances of the repeat object. The object conversion module 314 generates a first spline representation 504 of the first repeat object 502 by determining spline representation parameters for each instance (506, 508) of the first repeat object 502. One instance of the first repeat object 502 is selected to be or is identified as a repeated base object 506.

Examples of spline representation parameters include $L_x$ and $L_y$ that represent a translation in the x- and y-axes of an instance with respect to the location of the repeated base object 506 on the x- and y-axes as described by parameters $B_{cx}$ and $B_{cy}$, respectively, and $\Phi_i$ that represents the angle that an instance (e.g., instance 508) is rotated with respect to the repeated base object 506. These parameters for each instance can be calculated by leveraging the parameters of an affine transformation matrix, as discussed in the description of FIG. 3, as well. A system of equations to determine the spline representation parameters is as follows:

$$a_i = d_i = \cos(\phi_i)$$

$$b_i = \sin(\phi_i)$$

$$c_i = -\sin(\phi_i)$$

$$e_i = -B_{cx}*\cos(\phi_i) - B_{cy}*\sin(\phi_i) + L_x$$

$$F_i = B_{cx}*\sin(\phi_i) - B_{cy}*\cos(\phi_i) + L_y$$

From these equations, the object conversion module 314 can leverage the parameters of a respective affine transformation matrix of an instance 508 of a first repeat object 502 to determine the spline representation parameters by calculating $L_x$, $L_y$, and $\Phi_i$ for each instance. These parameters can then be used to determine a spline representation 504 with a node at the center of each instance (506, 508) of the first repeat object 502. As shown in FIG. 5, a second repeat object 510 is processed by the object conversion module 314 to generate a second spline representation 512. The blending module 116 blends the spline representation 504 of the first repeat object 502 and the second spline representation 512 of the second repeat object 510 to generate an intermediate spline representation 514 for generation of an intermediate object 516. For a single instance object, such as the second object 406 depicted as a visually different single object depicted in FIG. 4, a spline representation is represented by a single node.

As illustrated in example 600, the visual characteristic identification module 114 determines a rotation for each instance from a repeated base object. For example, for a first repeat object 602, a base object 604 and corresponding instance has a rotation of 0, pointing directly upwards, and the other three instances, 606, 608, and 610, have a clockwise rotation of 90, 180, and 270 degrees, respectively. Conversely, each instance of a second repeat object 612 is determined to be oriented in the same direction, i.e., no rotation from a base object instance 614. The blending module 116 determines intermediate rotations for each instance of an intermediate object 616 as depicted with rotated arrows.

Example methods 700 and 800 are described with reference to respective FIGS. 7 and 8 in accordance with one or more aspects of repeat object blending. Generally, any of the components, modules, methods, and operations described herein can be implemented using software, firmware, hardware (e.g., fixed logic circuitry), a processing device, manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 7:
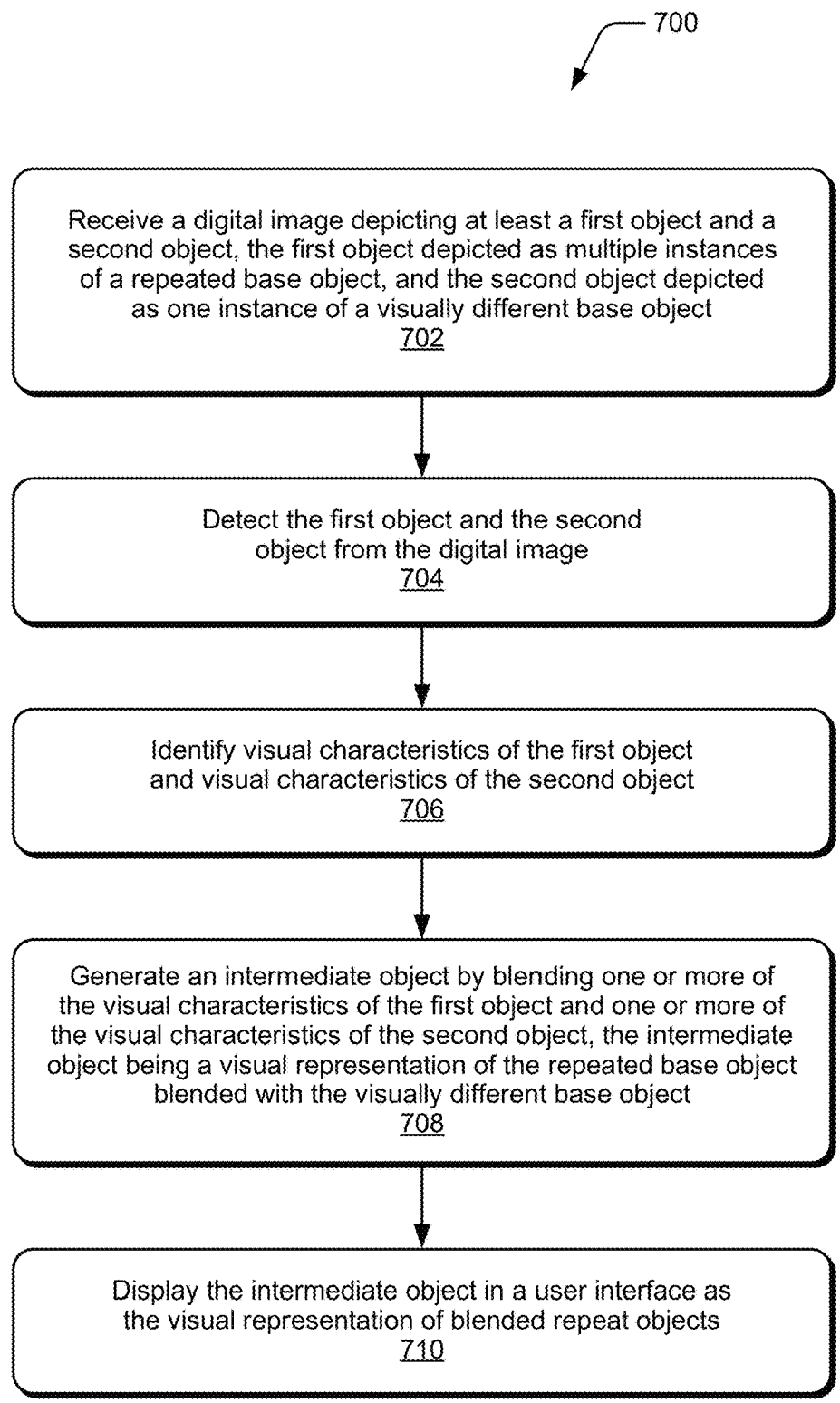
FIGS. 7 and 8 illustrate example methods of repeat object blending in accordance with one or more implementations.

FIG. 7 illustrates example method(s) 700 for repeat object blending and is generally described with reference to the repeat object blending system implemented by a computing device (e.g., processing device) as shown and described with reference to FIGS. 1-6. The order in which the method is described is not intended to be construed as a limitation, and any number or combination of the method operations can be combined in any order to implement a method, or an alternate method.

At block 702, a digital image depicting at least a first object and a second object is received, where the first object is depicted as multiple instances of a repeated base object, and the second object is depicted as one instance of a visually different base object. For example, the repeat object blending system 104 receives a digital image that depicts a first object 402 with multiple instances of a repeated base object 404 and a second object 406 with a single instance. The repeated base object 404 and the visually different base object as the second object 406 can be rendered as raster objects or vector objects.

At block 704, the first object and the second object are detected from the digital image. For example, the repeat object blending system 104 detects the second object 406 and each instance of the first object 402 depicted as a repeat object from the digital image 106.

At block 706, visual characteristics of the first object 402 and visual characteristics of the second object 406 are identified. Example visual characteristics include visual characteristics of a respective base object (e.g., color, pattern, shape of the base object 404), as well as the relative visual characteristics of each instance (e.g., position, orientation, and/or size of each instance of a repeat object) and a total number of instances of an object. For example, a total number of instances of the repeated base object 404 of the first object 402 is identified as four instances, and a total number of instances of the visually different base object of the second object 406 is identified as one instance, as depicted in the digital image. A total number of instances for the intermediate repeated base object is determined by interpolating between the total number of instances (e.g., four) of the repeated base object 404 and the total number of instances (e.g., one) of the visually different base object of the second object 406, resulting in three instances of the intermediate base object 410 in the intermediate object 408.

At block 708, an intermediate object is generated by blending one or more of the visual characteristics of the first object and one or more of the visual characteristics of the second object, where the intermediate object is a visual representation of the repeated base object blended with the visually different base object. For example, the intermediate object 408 includes multiple instances of an intermediate base object 410 that is the visual representation of the repeated base object 404 blended with the visually different base object of the second object 406. The blending may include converting the first object into a first spline representation 504 that is a spline path between multiple instances of transformations of the repeated base object 506 and converting the second object 406 into a second spline representation that is a single node. The first and second spline representations are blended to generate an intermediate spline representation by interpolating between the first spline representation 504 and the second spline representation. In an implementation, the identified visual characteristics of the first object and the second object that are raster objects are blended by interpolating between pixel colors of the repeated base object 404 and pixel colors of the visually different base object of the second object 406. In another implementation, the identified visual characteristics of the first object 402 and the second object 406 as vector objects are blended by interpolating between multiple nodes and curves of the repeated base object 404 and multiple nodes and curves of the visually different base object as the second object 406.

At block 710, the intermediate object is displayed in a user interface as the visual representation of blended repeat objects. For example, the user interface 108 displays the intermediate object 408 as a visual representation of the first object 402 as a repeat object and the second object 406 as a single object.

Figure 8:
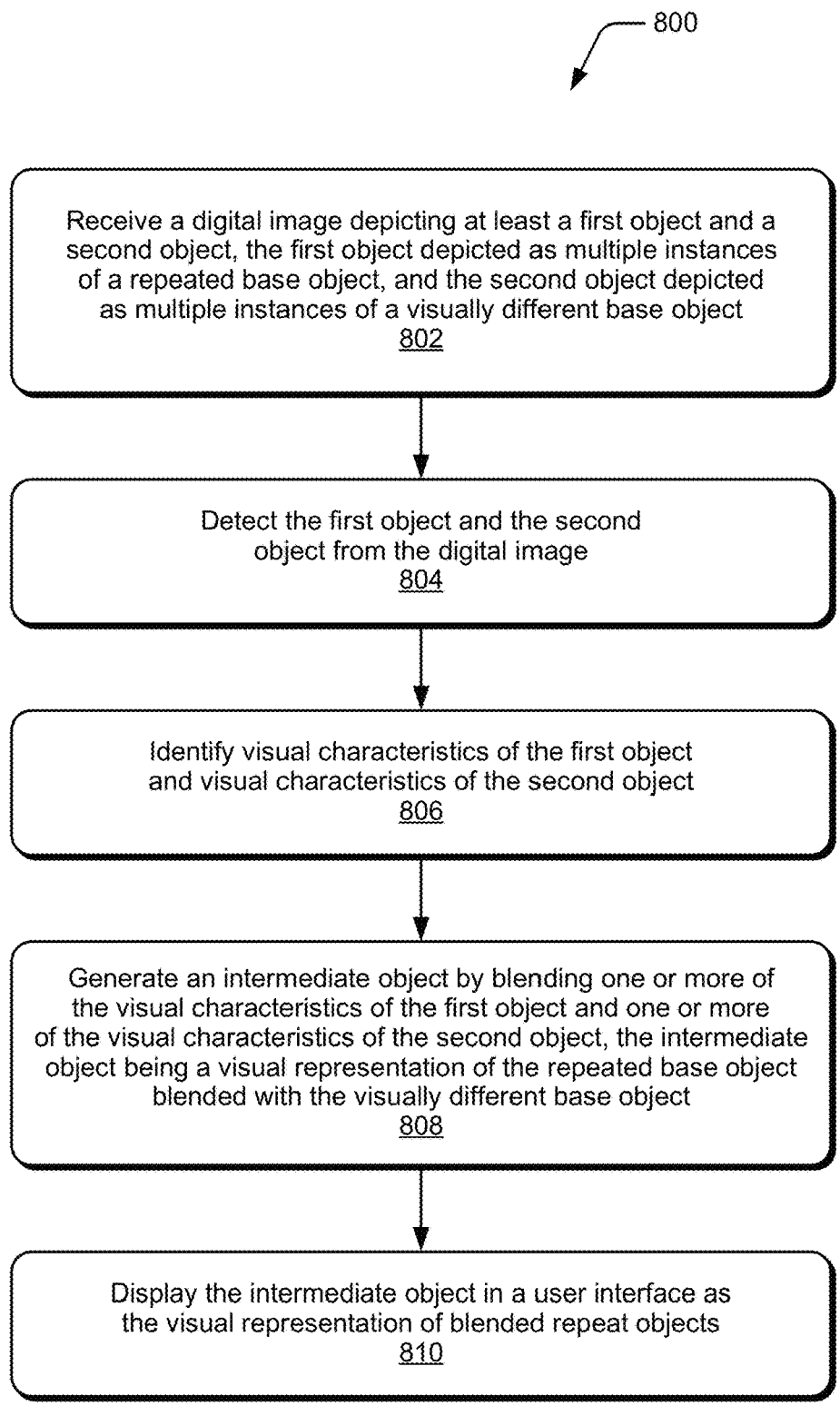

FIG. 8 illustrates example method(s) 800 for repeat object blending and is generally described with reference to the repeat object blending system implemented by a computing device (e.g., processing device) as shown and described with reference to FIGS. 1-6. The order in which the method is described is not intended to be construed as a limitation, and any number or combination of the method operations can be combined in any order to implement a method, or an alternate method.

At block 802, a digital image is received depicting at least a first object and a second object, the first object depicted as multiple instances of a repeated base object, and the second object depicted as multiple instances of a visually different repeated base object. For example, the repeat object blending system 104 receives a digital image 106, which depicts a first object 110 with multiple instances of a repeated base object 324 and a second object 112 with multiple instances of a visually different repeated base object, depicted as the second subsequent object 322.

At block 804, the first object and the second object are detected from the digital image. For example, the object detection module 312 detects the first object 110 and the second object 112 from the digital image 106.

At block 806, visual characteristics of the first object and visual characteristics of the second object are identified. For example, colors, pattern, shape, position, orientation, or size of each instance of the respective first object and the second object are identified. Additionally or alternatively, a total number of instances of the repeated base object 324 (e.g., four) as depicted in the digital image 106 is determined, and a total number of instances of the visually different repeated base object (e.g., six) depicted as the second subsequent object 322 is determined. For example, the object conversion module 314 converts a first repeat object 502 and a second repeat object 510 into respective spline representations (504, 512) that are each a spline path between multiple instances of transformations of the respective repeated base object.

At block 808, an intermediate object is generated by blending one or more of the visual characteristics of the first object and one or more of the visual characteristics of the second object, where the intermediate object is a visual representation of the repeated base object blended with the visually different repeated base object. For example, the blending module 116 generates an intermediate object 118 by blending visual characteristics of the first object 110 and visual characteristics of the second object 112. An intermediate spline representation 514, for example, is generated by interpolating between the first spline representation 504 of the first repeat object 502 and the second spline representation 512 of the second repeat object 510. Intermediate transformations are generated by interpolating between transformations of a first repeat object 602 and transformations of a second repeat object 612, such as rotation.

At block 810, the intermediate object is displayed in a user interface as the visual representation of blended repeat objects. For example, the intermediate object 118 is displayed in the user interface 108 as a visual representation of the first object 110 and the second object 112.

Figure 9:
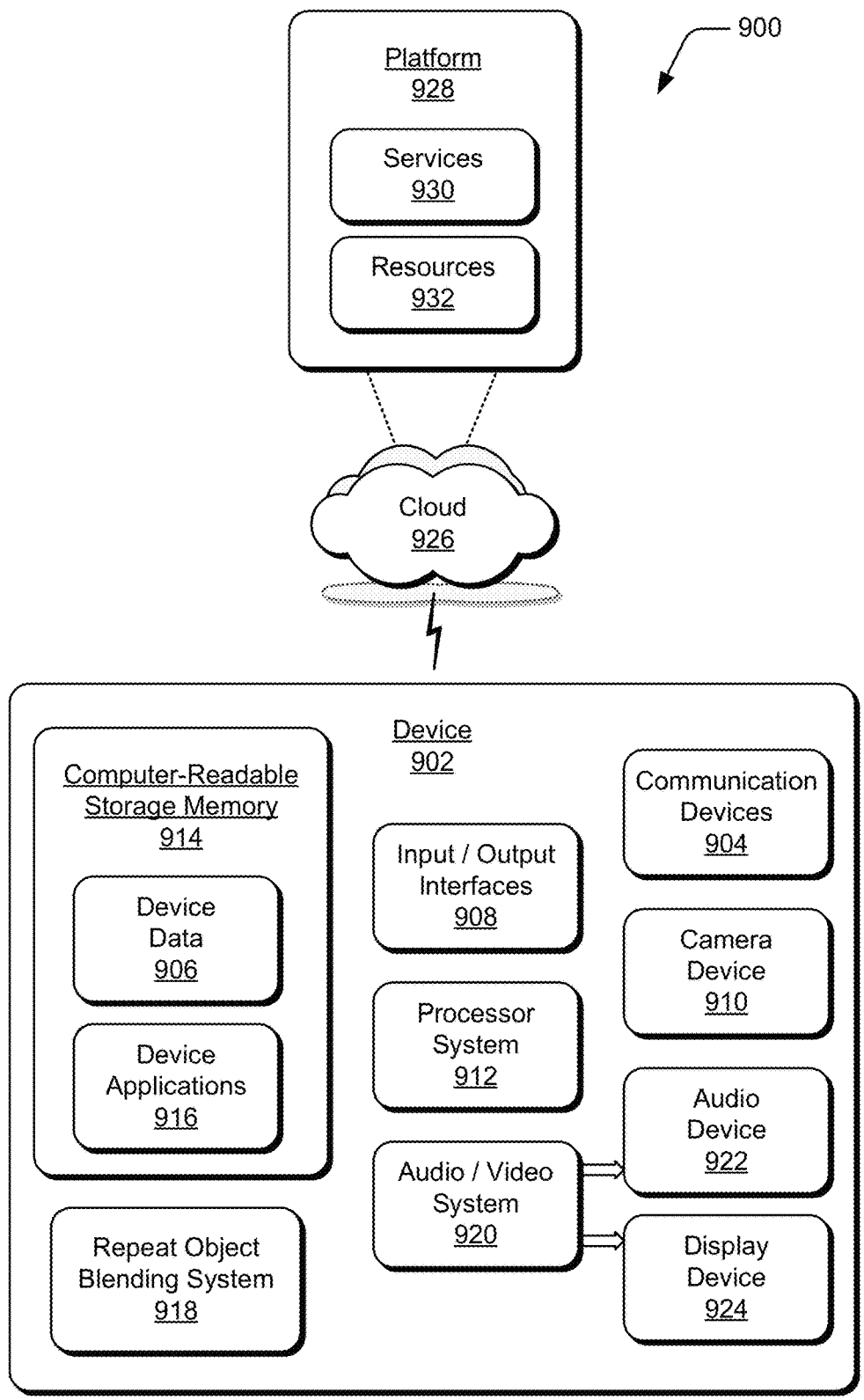
FIG. 9 illustrates an example system with an example device that can implement aspects of the techniques for repeat object blending.

FIG. 9 illustrates an example system 900 that includes an example device 902, which can implement techniques of repeat object blending. The example device 902 can be implemented as any of the computing devices, mobile devices, server devices, and/or services described with reference to the previous FIGS. 1-8, such as any type of computing device, client device, mobile phone, tablet, communication, entertainment, gaming, media playback, and/or other type of device. For example, the repeat object blending system 104 can be implemented by the example device 902.

The example device 902 includes communication devices 904 that enable wired and/or wireless communication of device data 906, such as any of the digital content, single and/or repeat objects, affine transformation matrixes, and/or any other repeat object data, as well as computer applications data and content that is transferred from one computing device to another, and/or synched between multiple computing devices. The device data 906 can include any type of audio, video, image, and/or graphics data that is received and/or generated by applications executing on the device. The communication devices 904 can also include transceivers for cellular phone communication and/or for network data communication.

The device 902 also includes input/output (I/O) interfaces 908, such as data network interfaces that provide connection and/or communication links between the device, data networks, and other devices. The I/O interfaces can be used to couple the device to any type of components, peripherals, and/or accessory devices, such as a digital camera device 910 and/or any other type of computer input device that may be integrated with the example device 902. The I/O interfaces also include data input ports via which any type of data, content, and/or inputs can be received, such as user inputs to the device, as well as any type of audio, video, and/or image data received from any content and/or data source.

The device 902 includes a processor system 912 that may be implemented at least partially in hardware, such as with any type of one or more microprocessors, controllers, and the like that process executable instructions. The processor system 912 can include components of an integrated circuit, a programmable logic device, a logic device formed using one or more semiconductors, and other implementations in silicon and/or hardware, such as a processor and memory system implemented as a system-on-chip (SoC). Alternatively or in addition, the device 902 can be implemented with any one or combination of software, hardware, firmware, or fixed logic circuitry that may be implemented with processing and control circuits. The device 902 may further include any type of a system bus or other data and command transfer system that couples the various components within the device. A system bus can include any one or combination of different bus structures and architectures, as well as control and data lines.

The example device 902 also includes computer-readable storage memory 914, such as data storage devices or components implemented in hardware that can be accessed by a computing device, and that provide persistent storage of data and executable instructions (e.g., software applications, modules, programs, functions, and the like). The computer-readable storage memory described herein excludes propagating signals. The computer-readable storage memory can be one or more non-transitory computer-readable media storing a plurality of executable instructions, which when executed by one or more processors, cause the one or more processors to perform operations. Examples of computer-readable storage memory include volatile memory and non-volatile memory, fixed and removable media devices, and any suitable memory device or electronic data storage that maintains data for computing device access. The computer-readable storage memory 914 can include various implementations of random access memory (RAM), read only memory (ROM), flash memory, and other types of storage memory in various memory device configurations.

The computer-readable storage memory 914 provides storage of the device data 906 and various device applications 916, such as an operating system that is maintained as a software application with the computer-readable storage memory and executed by the processor system 912. In this example, the device 902 includes a repeat object blending system 918 that implements the described techniques of repeat object blending. The repeat object blending system 918 may be implemented with hardware components and/or in software as one of the device applications 916, such as when the repeat object blending system 918 is implemented by the example device 902. An example of the repeat object blending system 918 includes the repeat object blending system 104, which can be implemented with various components, such as models, systems, algorithms, and/or networks. In implementations, the repeat object blending system 918 may include independent processing, memory, and logic components as a computing and/or electronic device integrated with the device 902.

In implementations, the repeat object blending system 918 and/or any of the components of the repeat object blending system can be implemented as any type of machine learning or neural network with trained classifiers, such as in software and/or in hardware in any type of computing device. The machine learning can be implemented by the device 902 as any type of a neural network or machine learning model, referring to a computer representation that can be tuned or trained based on inputs to approximate unknown functions. In particular, the term "machine learning model" can include a model that utilizes algorithms to learn from, and make predictions on, known data by analyzing the known data to learn to generate outputs that reflect patterns and attributes of the known data. For instance, a machine-learning model can include but is not limited to, decision trees, support vector machines, linear regression, logistic regression, Bayesian networks, random forest learning, dimensionality reduction algorithms, boosting algorithms, artificial neural networks, deep learning, generic programming, and the like. Thus, a machine-learning model makes high level abstractions in data by generating data-driven predictions or decisions from the known input data.

The device 902 also includes an audio and/or video system 920 that generates audio data for an audio device 922 and/or generates display data for a display device 924. The audio device and/or the display device include any devices that process, display, and/or otherwise render audio, video, display, and/or image data. In implementations, the audio device and/or the display device are integrated components of the example device 902. Alternatively, the audio device and/or the display device are external, peripheral components to the example device. In embodiments, at least part of the techniques described for repeat object blending may be implemented in a distributed system, such as over a "cloud" 926 in a platform 928. The cloud 926 includes and/or is representative of the platform 928 for services 930 and/or resources 932.

The platform 928 abstracts underlying functionality of hardware, such as server devices (e.g., included in the services 930) and/or software resources (e.g., included as the resources 932), and connects the example device 902 with other devices, servers, etc. The resources 932 may also include applications and/or data that can be utilized while computer processing is executed on servers that are remote from the example device 902. Additionally, the services 930 and/or the resources 932 may facilitate subscriber network services, such as over the Internet, a cellular network, or Wi-Fi network. The platform 928 may also serve to abstract and scale resources to service a demand for the resources 932 that are implemented via the platform, such as in an interconnected device embodiment with functionality distributed throughout the system 900. For example, the functionality may be implemented in part at the example device 902 as well as via the platform 928 that abstracts the functionality of the cloud system.

Although implementations of repeat object blending have been described in language specific to features and/or methods, the appended claims are not necessarily limited to the specific features or methods described. Rather, the specific features and methods are disclosed as example implementations of repeat object blending, and other equivalent features and methods are intended to be within the scope of the appended claims. Further, various different examples are described, and it is to be appreciated that each described example can be implemented independently or in connection with one or more other described examples.

The invention claimed is:

1. A computing device comprising:
a memory component to maintain a digital image depicting at least a first shaped object and a second shaped object, the first shaped object depicted as multiple instances of a repeated base object, and the second shaped object depicted as multiple instances of a visually different repeated base object; and
a repeat object blending system implemented at least partially in computer hardware, the repeat object blending system configured to:
obtain the first shaped object and the second shaped object;
identify visual characteristics of the first shaped object and visual characteristics of the second shaped object;
generate a first representation of an arrangement of the multiple instances of the repeated base object of the first shaped object and a second representation of an arrangement of the multiple instances of the repeated base object of the second shaped object; and
generate an intermediate object by blending one or more of the visual characteristics of the first shaped object and one or more of the visual characteristics of the second shaped object by interpolating the first representation with the second representation, the intermediate object being a visual representation of the repeated base object blended with the visually different repeated base object.

2. The computing device of claim 1, wherein the intermediate object includes multiple instances of an intermediate repeated base object that is the visual representation of the repeated base object blended with the visually different repeated base object.

3. The computing device of claim 2, wherein the repeat object blending system is configured to:
- determine a total number of instances of the repeated base object and a total number of instances of the visually different repeated base object as depicted in the digital image; and
- determine a total number of instances of the intermediate repeated base object by interpolating between the total number of instances of the repeated base object and the total number of instances of the visually different repeated base object.

4. The computing device of claim 2, wherein the intermediate object is generated based on a user input specifying a number of the multiple instances of the intermediate repeated base object.

5. The computing device of claim 1, wherein the repeat object blending system is configured to detect the first shaped object and the second shaped object from the digital image.

6. The computing device of claim 1, wherein the repeat object blending system is configured to convert the first shaped object and the second shaped object into respective spline representations that are each a spline path between multiple instances of transformations of the repeated base object and the visually different repeated base object.

7. The computing device of claim 6, wherein the repeat object blending system is configured to generate intermediate transformations by interpolating between the transformations of the first shaped object and the transformations of the second shaped object.

8. The computing device of claim 1, wherein:
- the repeated base object and the visually different repeated base object are raster objects; and
- the repeat object blending system is configured to blend the one or more visual characteristics of the first shaped object and the one or more visual characteristics of the second shaped object by interpolating between pixel colors of the respective raster objects.

9. The computing device of claim 1, wherein:
- the repeated base object and the visually different repeated base object are vector objects; and
- the repeat object blending system is configured to blend the one or more visual characteristics of the first shaped object and the one or more visual characteristics of the second shaped object by interpolating between multiple nodes and curves of the respective vector objects.

10. The computing device of claim 1, wherein the one or more visual characteristics of the respective first shaped object or the second shaped object include at least one of colors, position, orientation, or size of each instance of the respective first shaped object and the second shaped object.

11. A method comprising:
- receiving, by a processing device, a digital image depicting at least a first shaped object and a second shaped object, the first shaped object depicted as multiple instances of a repeated base object, and the second shaped object depicted as one instance of a visually different base object;
- identifying, by the processing device, visual characteristics of the first shaped object and visual characteristics of the second shaped object;
- generating, by the processing device, a first representation of an arrangement of the multiple instances of the repeated base object of the first shaped object and a second representation of an arrangement of the multiple instances of the repeated base object of the second shaped object; and
- generating, by the processing device, an intermediate object by blending one or more of the visual characteristics of the first shaped object and one or more of the visual characteristics of the second shaped object by interpolating the first representation with the second representation, the intermediate object being a visual representation of the repeated base object blended with the visually different base object.

12. The method of claim 11, wherein the intermediate object includes multiple instances of an intermediate repeated base object that is the visual representation of the repeated base object blended with the visually different base object.

13. The method of claim 12, further comprising:
- determining a total number of instances of the repeated base object and a total number of instances of the visually different repeated base object as depicted in the digital image; and
- determining a total number of instances of the intermediate repeated base object by interpolating between the total number of instances of the repeated base object and the total number of instances of the visually different base object.

14. The method of claim 11, further comprising detecting the first shaped object and the second shaped object from the digital image.

15. The method of claim 11, wherein the blending the one or more visual characteristics of the first shaped object and the one or more visual characteristics of the second shaped object includes:
- converting the first object into a first spline representation that is a spline path between multiple instances of transformations of the repeated base object; and
- converting the second shaped object into a second spline representation that is a spline path being a single node.

16. The method of claim 15, wherein the generating the intermediate object includes generating an intermediate spline representation by interpolating between the first spline representation and the second spline representation.

17. The method of claim 11, wherein:
- the repeated base object and the visually different base object are raster objects; and
- the one or more visual characteristics of the first object and the one or more visual characteristics of the second shaped object are blended by interpolating between pixel colors of the repeated base object and pixel colors of the visually different base object.

18. The method of claim 11, wherein:
- the repeated base object and the visually different base object are vector objects; and
- the one or more visual characteristics of the first shaped object and the one or more visual characteristics of the second shaped object are blended by interpolating between multiple nodes and curves of the repeated base object and multiple nodes and curves of the visually different base object.

19. The method of claim 11, further comprising displaying the intermediate object in a user interface as the visual representation of blended repeat objects.

20. A method comprising:
- receiving, by a processing device, a digital image depicting at least a first shaped object and a second shaped object, the first shaped object depicted as multiple instances of a repeated base object, and the second shaped object depicted as multiple instances of a visually different repeated base object;

identifying, by the processing device, visual characteristics of the first shaped object and visual characteristics of the second shaped object;

generating, by the processing device, a first representation of an arrangement of the multiple instances of the repeated base object of the first shaped object and a second representation of an arrangement of the multiple instances of the repeated base object of the second shaped object; and generating, by the processing device, an intermediate object by blending one or more of the visual characteristics of the first shaped object and one or more of the visual characteristics of the second shaped object by interpolating the first representation with the second representation, the intermediate object being a visual representation of the repeated base object blended with the visually different repeated base object.

\* \* \* \* \*